W. D. BLAIR & H. C. RAASCH.
WHEAT SHOCKING ATTACHMENT FOR HARVESTERS.
APPLICATION FILED JUNE 10, 1916.
1,221,820.
Patented Apr. 10, 1917.
2 SHEETS—SHEET 2.
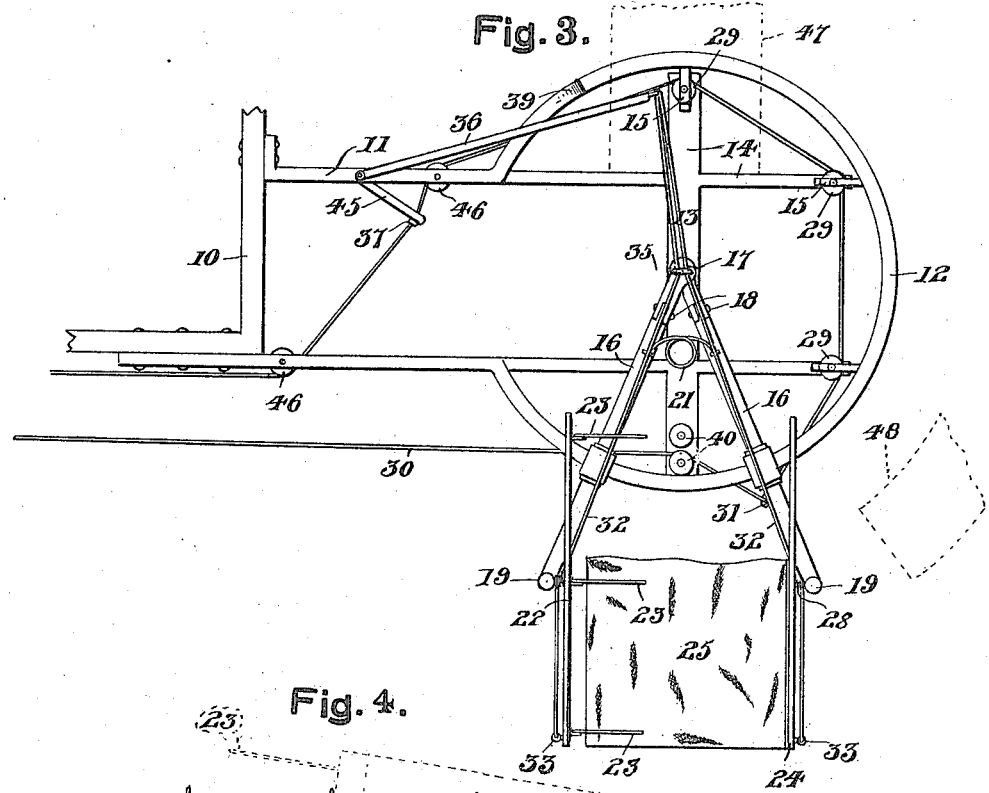
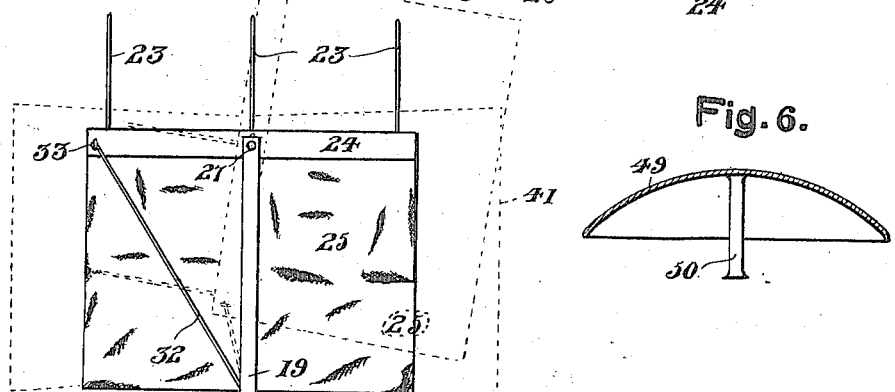
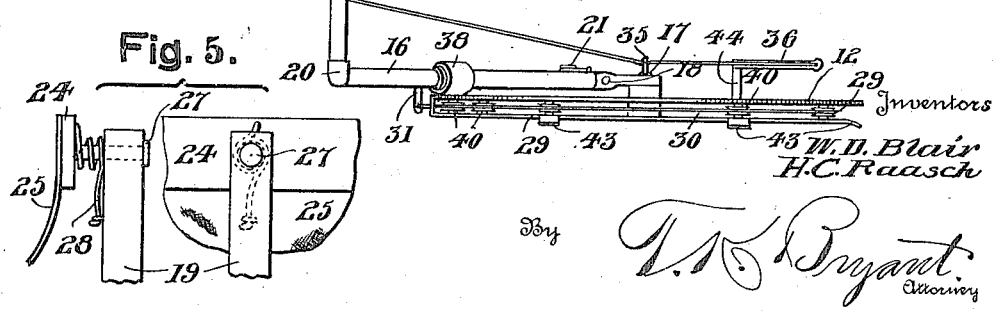

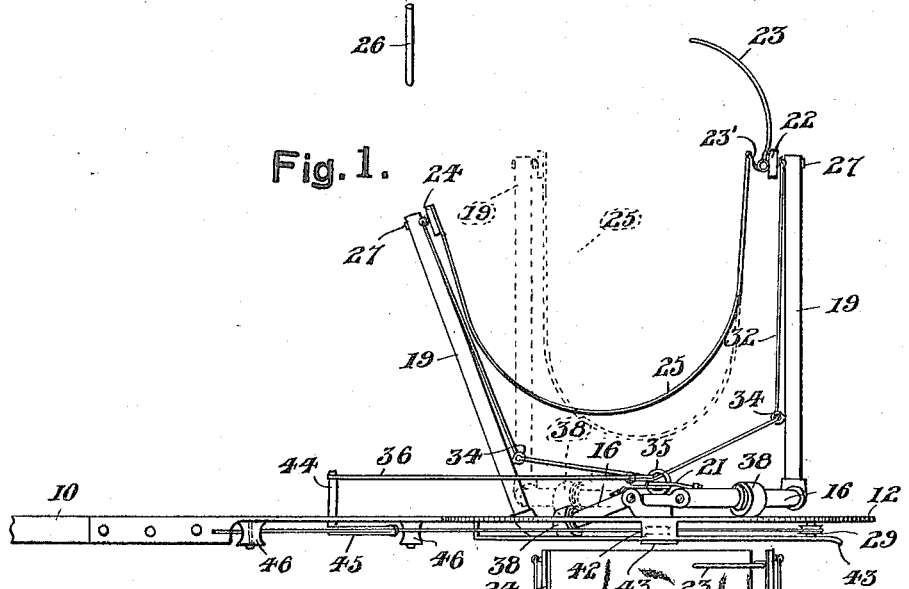
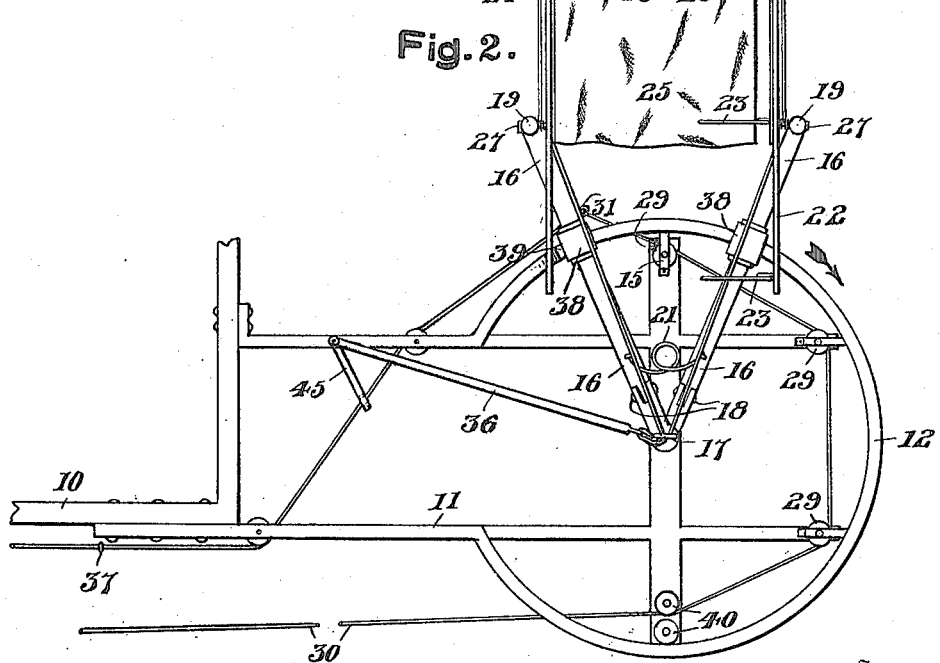

UNITED STATES PATENT OFFICE.

WALTER D. BLAIR AND HERMAN C. RAASCH, OF RED LAKE FALLS, MINNESOTA.

WHEAT-SHOCKING ATTACHMENT FOR HARVESTERS.

1,221,820.  Specification of Letters Patent.  Patented Apr. 10, 1917.

Application filed June 10, 1916. Serial No. 102,911.

*To all whom it may concern:*

Be it known that we, WALTER D. BLAIR and HERMAN C. RAASCH, citizens of the United States, residing at Red Lake Falls, in the county of Red Lake and State of Minnesota, have invented certain new and useful Improvements in Wheat-Shocking Attachments for Harvesters, of which the following is a specification.

This invention relates to certain new and useful improvements in wheat shocking attachments for harvesters.

The primary object of the invention is the provision of a wheat shocking attachment that is light in weight and readily secured to a harvesting machine, such as a self-binding harvester, the same being adapted to receive the bundles or sheaves of wheat and deposit a plurality thereof in a shock upstanding at the rear of the harvester.

A further object of the device is the provision of a harvester attachment adapted to be readily attached to the harvester for receiving and shocking the bundles of grain, carrying the desired number of bundles so assembled in a horizontal position to the rear of the harvester and then depositing the entire shock in an upright position upon the ground.

A still further object of the device is the provision of a labor saving device whereby the operator of a harvester may readily deposit the sheaves of grain assembled in a shock rather than promiscuously and singly as they are usually turned upon the ground by the expelling means of the harvester.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—

Figure 1 is a rear elevation of the device attached to harvester, parts being broken away.

Fig. 2 is a top plan view thereof.

Fig. 3 is a view similar to Fig. 2 with the device arranged in a position to deposit the shock rearwardly of the harvester.

Fig. 4 is a side view of the device arranged as shown in Fig. 3, with the shock illustrated in dotted lines as well as the collector when in its dumping position.

Fig. 5 is an enlarged detail end and side view of one of the spring pivots for the collector, and Fig. 6 is a vertical central sectional view of a mechanism cover for the device.

The device being designed as a shocking attachment for a harvester, a rear corner portion 10 of a harvester is herein illustrated having the substantially U-shaped frame 11 of the shocker secured thereto. A substantially circular track 12 is secured to the outer end or cross-piece 13 of the frame 11, supporting spokes or braces 14 extending outwardly from the corners of the frame 11 and secured to the track 12 by means of pulley guards or plates 15.

Two similar arms 16 in angular arrangement are radially pivoted with respect to the track 12 by means of a king bolt 17 centrally secured through the frame end 13, the said arms having hinged joints 18 adjacent their inner pivoted ends for allowing vertical movement of the free end portions of the arms.

The arms 16 have vertically arranged free ends or posts 19, the joints 20 at the angles of the arms being preferably adjustable for changing the angularity if desired while a coiled expansion spring 21 connects the two arms 16 for spreading the same when released.

A hand 22 is pivotally carried by the upper free end of one of the arm posts 19 provided with a plurality of spring fingers 23. The upper end of the opposite post 19 is provided with a hand 24 while a hammock or support 25 of flexible material, such as canvas, is secured between the hands 22 and 24 being attached to the hand 22 by means of the inner ends 23' of the fingers 23 and adapted for the reception of bundles deposited therein by the kicking or expelling bars such as 26 of the harvester 10. The pivotal connections for the said hands 22 and 24 are arranged as best illustrated in Fig. 5 of the drawings consisting of a stub axle 27 secured to the hands and having a coil spring 28 arranged therearound with one end of the spring secured to the adjacent hand and the other end thereof to the adjacent post 19 whereby the hands are normally positioned horizontal with the hammock 25 forming the receiving member of the device.

The outer ends of the braces 14 are each provided with a pulley wheel 29 lying beneath the guard plates 15 while the frame 11 has depending sheaves 46 over which pulleys a cord 30 passes, being secured to the free lower end of a pin 31 carried by one of the arms 16, both ends of the said cord 30 extending to a convenient point adjacent the driver's seat for the ready operation of the device.

Tripping cables 32 are attached to the free outer ends of the hands 22 and 24 as at 33 and passing through loops 34 arranged upon the posts 19 and thence through an eye 35 upon the head of the king bolt 17, the said cables are attached to the free end of a rod 36 supported by a post 44 vertically journaled through the frame 11. A lever 45 is secured to the lower end of the post 44 having a perforation in its free end, through which the cord 30 freely extends, a stop 37 being arranged upon the cord 30 to engage and move the lever 45 when the cord is pulled therethrough.

It will be understood that the frame braces 14 as well as the outer end portion of the frame 11 is depressed and upon a lower level than the track 12, the rear brace being connected to the track by a web 42, while the other braces have their free ends 43 curved downwardly, serving with the plates 15 to direct the cord 30 onto the pulley wheels 29.

The complete operation of the device will be apparent from the present detailed description thereof, it being understood that the receiving apron 25 and the mounting arms 22 and 24 are normally arranged open and adjacent the kicker bar 26 as illustrated in Fig. 1 of the drawings. When a sufficient number of bundles of wheat or grain have been deposited within the receiving device upon the apron or hammock 25, the cord 30 is pulled by the operator in such a manner as to rotate the arms 16 around the king bolt 17 in the direction indicated by the arrow in Fig. 2, the said arms 16 being provided with encircling rollers 38 positioned for movement upon the said track 12. The arm 16 which supports the unfingered hand 24 has its outer end normally bent downwardly upon its hinge joint 18 when the receiving device is normally open, a depression 39 in the track providing for such lowering of one side of the receiving device.

During the rotation of the carrier through the agency of the arms 16, the cord 30 will be removed successively from the pulleys 29 until the arms and carrier are rearwardly positioned ready for dumping the shock and at which times the cord 30 will still be retained in operative contact by the double pulleys 40 upon the rear brace of the frame 11, as best illustrated in Fig. 3 of the drawings.

The hammock 25 when filled with bundles of grain will be substantially evenly balanced upon the pivoting axles 27 and upon pulling the cord 30 the arm 45 is contacted and carried along by the stop knot 37 of the cord 30, thereby exerting a slight pull upon the trip cords 32, causing the forward end of the hands 22 and 24 to swing downwardly to the dotted line position illustrated in Fig. 4 of the drawings and whereby the shock 41 will be tilted for deposit in an upright position upon the ground at the rear of the track 12, the spring 21 assisting in separating the arms 16 and hands 22 and 24 when the cord 30 is slackened, it being understood that only a slight pull is required upon the trip cords 32 for the purpose of dumping the shock. After the shock has been delivered, the opposite end of the cord 30 may be pulled by the operator for returning the arms 16 to their normal position with the receiving device ready to receive a further supply of bundles of grain. It will be noted that the cord 30 which has left the pulleys 29 during the rearward swing of the shock carrier, again assumes its position upon the pulleys 29 during the forward return movement of the carrier while the trip cords 32 assume their normal positions when the hands 22 and 24 are automatically returned horizontally by the pivot springs 28.

It will thus be seen that the device provides an economical attachment for different forms of harvesters and binders whereby the bundles of grain are readily formed in a shock and deposited in order at the rear of the machine, requiring no attention in setting up the grain.

A platform or rest 47 having a semi-circular portion 48 as indicated by dotted lines in Fig. 3 of the drawings may be provided to support the hammock 25 and keep the same from sagging when containing grain.

An umbrella-shaped cover 49 is provided for fitting over the track 12 being attached in any suitable manner by the central standard 50 thereof, preferably secured in an upright position upon the terminal eye 35 of the king bolt 17.

While the form of the invention herein shown and described is what is believed to be the preferred embodiment thereof, it is nevertheless to be understood that various forms, modifications and arrangement of the parts may be made without departing from the spirit and scope of the invention as claimed.

What is claimed as new is:—

1. A shocker for harvesters comprising a frame having a depressed end portion provided with projecting braces, a substantially circular track carried by the end of the frame above the level of the said depressed portion, pulley wheels upon said braces, guard plates overlying the said wheels connecting said track and braces, the free outer ends of said braces being depressed and positioned substantially opposite the said plates, radially projecting arms pivoted upon said depressed portion of the frame, a dumping sheaf receiver upon the said arms, and an operating cord secured to one of the said arms arranged upon the said wheels when the device is normally positioned and being removable therefrom and returnable thereto between said plates and brace ends during the operation of the device.

2. A shocker for harvesters comprising a frame having a depressed end portion, a substantially circular track carried by the end of the frame above the level of the said depressed portion, pulley wheels upon the depressed end portion of the frame, radially projecting arms centrally pivoted upon the said frame, anti-friction rollers upon the said arms positioned upon the said track, an expansion spring for the said arms, an operating cord secured to one of the said arms arranged upon the said wheels when the device is normally positioned and removable therefrom during the operation of the device, normally horizontal hands pivoted upon the free ends of the said arms, a flexible receiving apron secured between the said hands, resilient fingers carried by one of the said hands, a trip cord secured to the free ends of the said hands, and operative connections between the said trip cord and operating cord.

3. A grain shocker for harvesters comprising a frame, a track having a depressed portion mounted upon the free end of the said frame, a pivot bolt upon the said frame, diverging arms radially arranged with respect to the said track mounted upon the said pivot bolt, hinge joints in the said arms, rollers upon the said arms mounted upon the said track, upright end portions carried by the said arms, normally horizontal hands pivoted upon the free ends of the said upright portions, a flexible receiving apron secured between the said hands, resilient fingers carried by one of the said hands, a trip cord secured to the free ends of the said hands, and simultaneously actuated operating means for said arms in operative relations with respect to the said cord.

In testimony whereof we affix our signatures.

WALTER D. BLAIR.
HERMAN J. RAASCH.

Copies of this patent may be obtained for five cents each, by addressing the "Commissioner of Patents, Washington, D. C."